US011763103B2

(12) United States Patent  
Du et al.

(10) Patent No.: US 11,763,103 B2  
(45) Date of Patent: Sep. 19, 2023

(54) VIDEO TRANSLATION METHOD AND APPARATUS, STORAGE MEDIUM, AND ELECTRONIC DEVICE

(71) Applicant: BEIJING BYTEDANCE NETWORK TECHNOLOGY CO., LTD., Beijing (CN)

(72) Inventors: Yuzhang Du, Beijing (CN); Peihao Zhu, Beijing (CN); Yiming Chen, Beijing (CN); Chongxing Zhou, Beijing (CN); Mingxuan Wang, Beijing (CN); Lei Li, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/818,969

(22) Filed: Aug. 10, 2022

(65) Prior Publication Data  
US 2022/0383000 A1 Dec. 1, 2022

Related U.S. Application Data

(63) Continuation of application No. PCT/CN2021/010138, filed on Jun. 22, 2021.

(30) Foreign Application Priority Data

Jun. 23, 2020 (CN) .......................... 202010583177.4

(51) Int. Cl.  
*G06F 40/30* (2020.01)  
*G06F 40/58* (2020.01)  
(Continued)

(52) U.S. Cl.  
CPC ............. *G06F 40/58* (2020.01); *G06F 3/165* (2013.01); *G06F 40/166* (2020.01); *G06F 40/51* (2020.01);  
(Continued)

(58) Field of Classification Search  
CPC .......... G06F 40/58; G06F 40/44; G06F 40/45; G06F 40/47; G10L 15/00  
See application file for complete search history.

(56) References Cited

U.S. PATENT DOCUMENTS 9,558,182 B1 * 1/2017 Chenon ................. G06F 40/242  
9,772,816 B1 * 9/2017 Bigham .................. G06F 3/167  
(Continued)

FOREIGN PATENT DOCUMENTS

CN 105828101 A 8/2016  
CN 107885729 A 4/2018  
CN 111753558 A 10/2020

OTHER PUBLICATIONS

Search Report dated Sep. 24, 2021 in PCT/CN2021/101388, English translation (12 pages).

*Primary Examiner* — Lamont M Spooner

(57) ABSTRACT

A video translation method includes: converting speech in a video to be translated into text; displaying the text and first time information, second time information, and a reference translation of the text; in response to an operation by a user on the text or the reference translation, displaying an editing area supporting the user inputting a translation; following input by the user, providing a translation suggestion from the reference translation; when a confirmation operation by the user for the translation suggestion is detected, using the translation suggestion as a translation result and displaying the same; when a non-confirmation operation by the user for the translation suggestion is detected, receiving a translation inputted by the user which is different from the translation suggestion, using the inputted translation as a translation result and displaying the same, and updating the reference translation in a translation area according to the inputted translation.

20 Claims, 4 Drawing Sheets

Before segmentation

After segmentation

(51) Int. Cl.
  *G10L 15/00* (2013.01)
  *G06F 40/166* (2020.01)
  *G06F 40/51* (2020.01)
  *G06F 3/16* (2006.01)
  *G10L 15/26* (2006.01)
  *G10L 25/57* (2013.01)
  *G11B 27/02* (2006.01)

(52) U.S. Cl.
  CPC .............. *G10L 15/26* (2013.01); *G10L 25/57* (2013.01); *G11B 27/02* (2013.01)

(56) References Cited

U.S. PATENT DOCUMENTS

| | | | |
|---|---|---|---|
| 9,946,712 B2* | 4/2018 | Shen | H04N 21/4884 |
| 11,545,156 B2* | 1/2023 | Zeng | G06N 20/00 |
| 2002/0052861 A1* | 5/2002 | Gustman | G06F 16/40 |
| 2002/0161579 A1* | 10/2002 | Saindon | G10L 15/26 |
| | | | 704/235 |
| 2003/0069879 A1* | 4/2003 | Sloan | G06F 40/12 |
| 2004/0015548 A1* | 1/2004 | Lee | H04L 51/58 |
| | | | 709/204 |
| 2010/0332214 A1* | 12/2010 | Shpalter | H04N 21/4884 |
| | | | 382/176 |
| 2014/0201631 A1* | 7/2014 | Pornprasitsakul | G06F 40/58 |
| | | | 715/716 |
| 2014/0288914 A1* | 9/2014 | Shen | G06F 40/58 |
| | | | 704/2 |
| 2015/0042771 A1 | 2/2015 | Jensen et al. | |
| 2015/0066505 A1* | 3/2015 | Baker | G10L 15/08 |
| | | | 704/235 |
| 2015/0179173 A1* | 6/2015 | Cho | G10L 15/26 |
| | | | 704/235 |
| 2016/0162166 A1* | 6/2016 | Kleine-Horst | G06F 40/166 |
| | | | 715/762 |
| 2016/0314116 A1* | 10/2016 | Kamatani | G06F 40/216 |
| 2017/0091177 A1* | 3/2017 | Sonoo | G10L 13/08 |
| 2017/0213569 A1* | 7/2017 | Jang | G10L 25/87 |
| 2017/0249299 A1* | 8/2017 | Otsuka | G06F 40/58 |
| 2020/0394271 A1* | 12/2020 | Bihani | G06F 40/58 |
| 2021/0165973 A1* | 6/2021 | Kofman | G06F 40/30 |
| 2021/0286956 A1* | 9/2021 | Santo | G06F 40/35 |

* cited by examiner

| 00:00:02 | 首先介绍一下什么是热点 |

| 00:00:05 | First, let's introduce what Hot Spot is. |

| Play | Merge | Split | First, let's introduce what Hot Spot is. |

| 00:00:06 | 从ppt的右边能够看到 |

| 00:00:07 | You can see it from the right of PPT. |

| 00:00:08 | 一个是产品A热搜榜的截图 |

| 00:00:10 | One is a screenshot of the product A |

Figure 2

VIDEO TRANSLATION METHOD AND APPARATUS, STORAGE MEDIUM, AND ELECTRONIC DEVICE

The present disclosure is a continuation of International Application No. PCT/CN2021/101388, filed on Jun. 22, 2021 which claims priority of Chinese Patent Application No. 202010583177.4, titled "VIDEO TRANSLATION METHOD AND APPARATUS, STORAGE MEDIUM AND ELECTRONIC DEVICE", filed with the China National Intellectual Property Administration on Jun. 23, 2020, both of which are incorporated herein by reference in their entireties.

TECHNICAL FIELD

The present disclosure relates to the field of machine translation, and in particular to a method and an apparatus for translating a video, a storage medium and an electronic device.

BACKGROUND

With the development of machine translation, a simple translation task is already carried out through machine translation plus manual proofreading, namely, machine translation post-editing (MTPE). In the current MTPE technology, the manual proofreading is not well compatible with the machine translation, so that the translation obtained through MTPE is still not as good as human translation in terms of the translation quality. As a result, the development of MTPE is seriously restricted. In a scenario where the accuracy of a translation result is highly required, human translation is usually applied. However, the human translation has the problem of low efficiency and slow speed. Moreover, when a video is to be translated, the content of the video is heard and translated sentence by sentence by a human translator. With this inefficient translation method, the massive demand for video translation cannot be met in the context of globalization.

SUMMARY OF THE INVENTION

The section of Summary of the Invention is provided to introduce concepts in a simplified form that are described in detail in the section of Detailed Description of Embodiments that follows. The section of Summary of the Invention is not intended to identify key features or essential features of the claimed technical solution, and nor intended to limit the scope of the claimed technical solution.

In a first aspect, a method for translating a video is provided according to the present disclosed. The method includes:

converting a speech of a video to be translated to a text;

presenting the text, and first time information, second time information and a reference translation of the text, where the first time information is a start time of the text in the video, and the second time information is an end time of the text in the video;

presenting an editing area in response to an operation of a user on the text or the reference translation, where the editing area is configured to support the user to input the translation;

providing a translation recommendation from the reference translation, following an input of the user in the editing area;

where the method further includes: displaying the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, displaying the translation inputted by the user in the editing area as the translation result, and updating the reference translation in a translation area according to the translation inputted by the user.

In a second aspect, an apparatus for translating a video is provided according to the present disclosed. The apparatus includes: a conversion module, a presentation module, and a recommendation module.

The conversion module is configured to convert a speech of a video to be translated into a text.

The presentation module is configured to present the text, and first time information, second time information and a reference translation of the text, where the first time information is a start time of the text in the video, and the second time information is an end time of the text in the video.

The presentation module is further configured to present an editing area in response to an operation of a user on the text or the reference translation, where the editing area is configured to support the user to input the translation.

The recommendation module is configured to provide a translation recommendation from the reference translation, following an input of the user in the editing area.

The presentation module is further configured to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result, and update the reference translation in a translation area according to the translation inputted by the user.

In a third aspect, a computer readable medium storing a computer program thereon is provided according to the present disclosure. The program, when executed by a processing apparatus, performs steps of the method according to the first aspect of the present disclosure.

In a fourth aspect, an electronic device is provided according to the present disclosure. The electronic device includes: a storage apparatus and a processing apparatus The storage apparatus stores a computer program thereon, and the processing apparatus is configured to execute the computer program stored on the storage apparatus to perform steps of the method according to the first aspect of the present disclosure.

Based on the above technical solution, at least the following technical effects are achieved. The speech of the video to be translated is converted into the text. The first time information, the second time information and the reference translation of the text is provided. The translation recommendation from the reference translation is provided following the input of the user in the editing area and is displayed as the translation result in response to the confirmation operation of the user. Therefore, the input time is saved for the user, and the efficiency and quality of video translation are improved by combining the accuracy of human translation with the efficiency of machine translation.

Other features and advantages of the present disclosure are described in detail in the section of Detailed Description of Embodiments that follows.

BRIEF DESCRIPTION OF THE DRAWINGS

The above and other features, advantages and aspects of the embodiments of the present disclosure will be more apparent in conjunction with the drawings and with reference to the following embodiments. The same or similar reference numerals throughout the drawings represent the same or similar elements. It should be understood that the drawings are schematic and the components and elements are unnecessarily drawn to scale. In the drawings:

FIG. 2 is a schematic diagram showing a translation interface according to an exemplary disclosed embodiment.

DETAILED DESCRIPTION OF EMBODIMENTS

Figure 1:
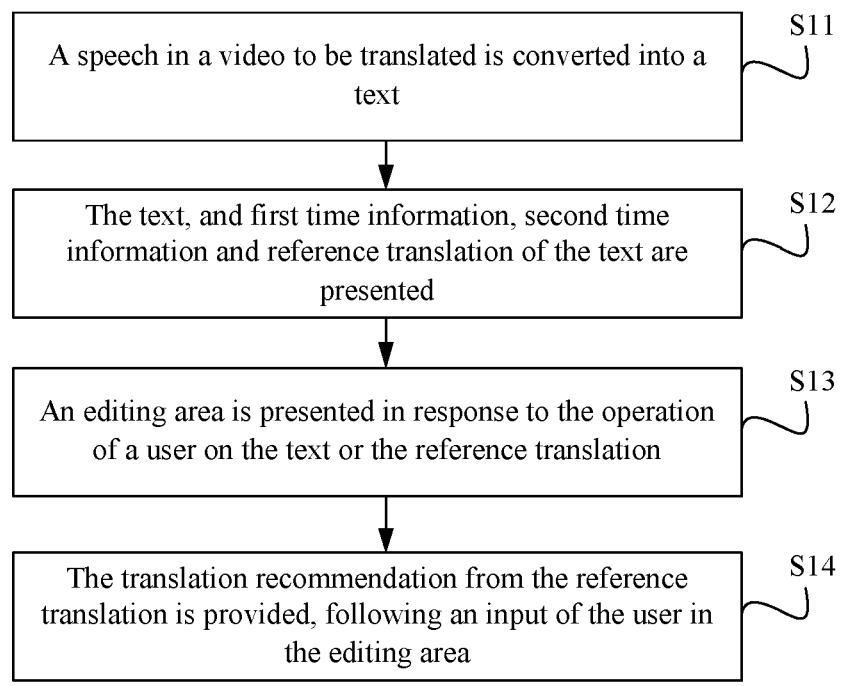
FIG. 1 is a flowchart of a method for translating a video according to an exemplary disclosed embodiment.

Embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiment of the present disclosure may be performed in different orders and/or in parallel. In addition, the method embodiment may include an additional step and/or an omitted step that is not shown herein. The scope of the present disclosure is not limited in this aspect.

The term "include" and its variations in the present disclosure means open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not used to limit an sequential order or interdependence of the functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

Names of messages or information exchanged between multiple apparatuses in the embodiments of the present disclosure are only for illustrative purposes, and are not intended to limit the scope of the messages or information.

FIG. 1 is a flowchart of a method for translating a video according to an exemplary disclosed embodiment. The method may be applied to terminals, servers and other independent electronic devices, and also to a translation system. In this case, steps in the method may be performed with the cooperation of multiple devices in the translation system. For example, operations of S12 and S14 shown in FIG. 1 may be performed by a terminal, and operations of S11 and S13 may be performed by a server. As shown in FIG. 1, the method for translating a video includes the following steps.

In S11, a speech in a video to be translated is converted into a text.

Speech content in the video to be translated, such as an audio track, is extracted. The speech content is converted into text content through the speech recognition technology. It should be noted that the text content is divided into multiple sentences according to segments in the speech content in a process of converting the speech content into the text content. A text content of each of the sentences corresponds to a piece of time information on the segment of the extracted speech content. The piece of time information is used as timeline information on the text content of the sentence.

For example, the speech content of the video to be translated is recognized into multiple sentences. The first sentence is "首先介绍一下什么是热点". This sentence is timed between the 2nd and 5th seconds in the video. Then the timeline information corresponding to the text content of this sentence is "00:00:02-00:00:05". In the second sentence, it says "从ppt 的右边可以看到", this sentence is timed between the 5th and 7th seconds in the video. Then the timeline information corresponding to the text content of this sentence is "00:00:05-00:00:07".

The text is segmented according to the time information and/or a picture frame corresponding to the text in the video to obtain multiple segmented texts, in the process of converting the speech content of the video to be translated into the text content. For example, a text obtained by recognizing the speech for every multiple consecutive seconds is set as a segment, or a text obtained by recognizing the speech included in multiple consecutive picture frames is set as a segment. The text may also be segmented according to a pause occurring in the speech content. For example, a pause threshold is set. When no human speech content is recognized within the pause threshold, the text is segmented at any position where no human speech content is recognized. The text may also be segmented according to semantics of the speech content. That is, the text is segmented prior to or following a segmented word. For example, the "object" of a full structure including "subject+predicate+object" is set as the segmented word to segment the speech content. Auxiliary words indicating time, or words indicating pause may be set as the segmented word, and the text is segmented prior to or following these words. Specifically, the recognized text content is segmented by using a sentence segmentation model to obtain segmented text content.

In S12, the text, and first time information, second time information and reference translation of the text are presented.

The first time information is a start time of the text in the video, and the second time information is an end time of the text in the video.

The text may be the segmented text. The first time information is the start time of a current segment of the segmented text in the video, and the second time information is the end time of the current segment of the segmented text in the video. For each segment, the segmented text, and the first time information, the second time information and the reference translation of the segment text are presented.

In S13, an editing area is presented in response to the operation of a user on the text or the reference translation.

When the user selects an area corresponding to the text or the reference translation, the editing area is presented above the reference translation for the text. The editing area is configured to support the user to input the translation. The user may perform an editing operation in the editing area to obtain a translation result for the text. The editing area is displayed above the reference translation, such that the user may modify the translation result in the light of the reference translation.

The text may be the segmented text. Different segmented texts are presented in different areas. For each segment, the first time information, second time information and reference translation corresponding to the segmented text are presented.

In a possible embodiment, the text includes multiple segmented texts, which are presented in respective areas. A split function bar that is provided for the user to split the segmented texts. The segmented text is split into at least two segmented sub-texts in response to the split operation performed by the user on any one of the segmented texts. For each segmented sub-text, the first time information and the second time information of the segmented sub-text, and the reference translation for the segmented sub-text are displayed in association with the segmented sub-text. Optionally, the split function bar is provided in response to the operation of the user on the segmented text or reference translation, and the split function bar is hidden before the user selects the segmented text or reference text.

For example for text content "今天要为大家介绍的就是我国即将崛起的三座城市", the timeline information on the text content is "00:00:15-00:00:18". The first time information is 00:00:15, and the second time information is 00:00:18. The user segments the text content into two clauses, namely, "今天要为大家介绍的就是" and "我国即将崛起的三今天要为大家介绍". A timeline is set for each of clauses according to a length of the text before edit and the length of each of clauses of the edited text. For example, the original timeline is split into two sections with the same length. The timeline for the first clause "今天要为大家介绍的就是" is set to "00:00:15-00:00:16", and the timeline information on the second clause "我国即将崛起的三座城市" is set to "00:00:17-00:00:18".

The timeline is assigned to each word included in the text content according to the number of words of the text content, and the timeline corresponding to the number of the words of clause is assigned to the clause, after the text is segmented.

Figure 3:
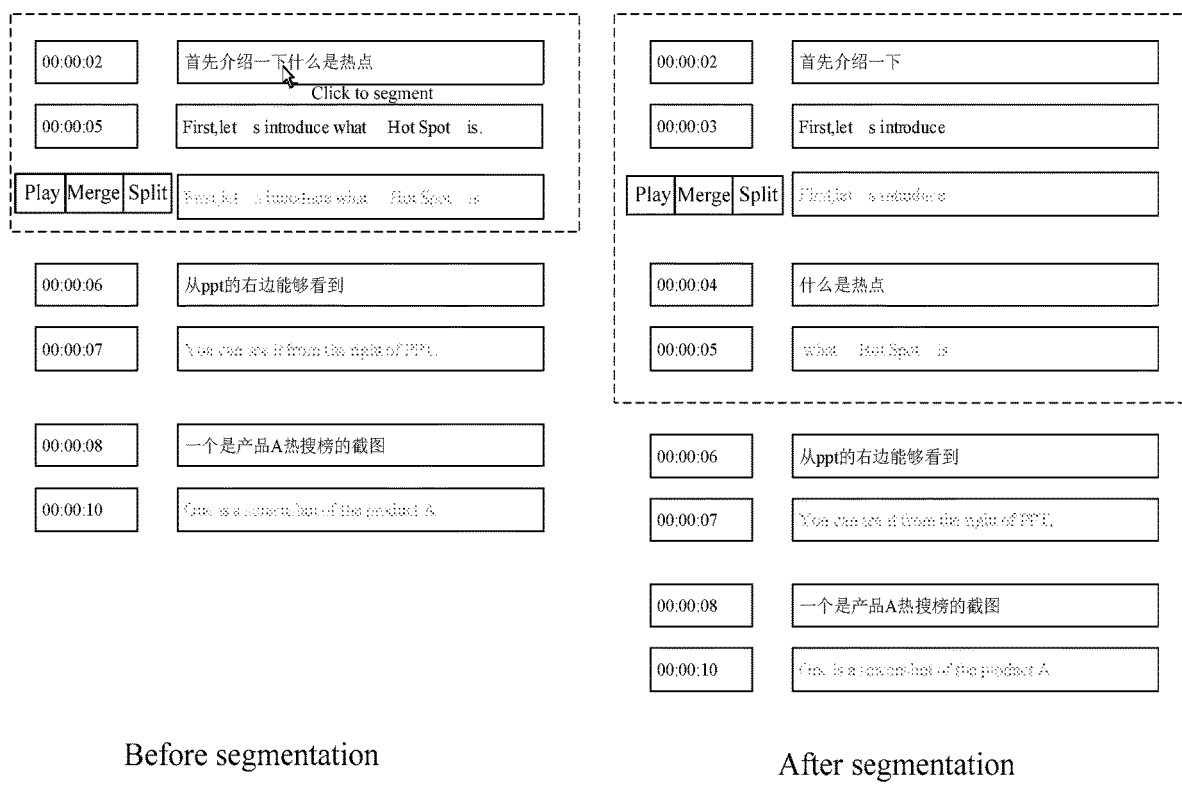
FIG. 3 is a schematic diagram showing a text splitting method according to an exemplary disclosed embodiment.

FIG. 3 is a schematic diagram showing a method for splitting a text. As shown in FIG. 3, the user may select a position where the text is to be segmented, by a cursor; and click a split button. The unsegmented text is split into two clauses and the two clauses are displayed in sequence. The first time information and the second time information on each of clauses are obtained by splitting the first time information and the second time information of the unsegmented text. In FIG. 3, unsegmented text content in the dashed box is split into two clauses in the dashed box.

In a possible embodiment, the text includes multiple segmented texts. Different segmented texts are presented in different areas. A merge function bar is provided for the user to merge the segments. Two adjacent segmented texts are merged into a piece of new segmented text, in response to a merge operation of the user on any two adjacent segmented texts. For the new segmented text, the first time information and the second time information on the new segmented text, and the reference translation for the new segmented text are displayed in association with the new segmented text. Optionally, the merge function bar is provided in response to the operation of the user on the segmented text or reference translation, and the merge function bar is hidden before the user selects the segmented text or reference text.

In a possible embodiment, the text includes multiple segmented texts. Different segmented texts are presented in different areas. A play function bar is provided for the user to play the segmented text. The speech corresponding to the segmented text is played, in response to an operation of the user on the play function bar. Optionally, the play function bar is provided in response to the operation of the user on the segmented text or reference translation, and the play function bar is hidden before the user selects the segmented text or reference text. Moreover, in a possible embodiment, the video corresponding to the segmented text is played with the reference translation or the translation result being used as a subtitle, so that the user can check the effect of the translated subtitle.

FIG. 2 is a schematic diagram showing a possible translation interface. In FIG. 2, a translation interface of text content selected by the user is shown in the dashed box. Three pieces of different text contents are shown in FIG. 2. An editing area, a play function bar, a merge function bar, and a split function bar are presented for the text content selected by the user. The text content of the video to be translated is displayed above the reference translation, and various segments are presented in various areas. The text may be translated independently in the presentation area thereof, and the translation is not updated as the modification in other areas. The user may input a character in the editing area, or modify the character of the text to be translated. The translation interface may further include timeline information. The timeline information includes first time information representing the start time and second time information representing the end time. In FIG. 2, the reference translation is in grey characters, and a translation recommendation is in black characters. As shown in FIG. 2, when the user selects a piece of text content, the reference translation moves down one line to be in the same line with the function bars. The area where the reference translation is originally located becomes the editing area, to present the translation recommendation and receive the modification made by the user.

In S14, the translation recommendation from the reference translation is provided, following an input of the user in the editing area.

Based on the translation recommendation, the method according to the embodiment of the present disclosure includes: displaying the translation recommendation in the editing area as the translation result, in response to a detection of a confirmation operation of the user on the translation recommendation; and receiving a translation inputted by the user that is different from the translation recommendation in response to a detection of a non-confirmation operation of the user on the translation recommendation, and updating the reference translation in the translation area according to the translation inputted by the user.

In specific implementation, the confirmation operation described above may be an operation of a user on a preset shortcut key. For example, the user expresses an intention of accepting the translation recommendation by clicking the shortcut key. Therefore, the translation recommendation may be displayed in the editing area as the translation result, in the case that the user's operation of clicking the shortcut key is detected. It should be noted that the action of displaying the translation recommendation in the editing area as the translation result will be regarded as the input of the user in the editing area described in step S14. In other words, in this case, step S14 indicates that in the method according to the embodiment of the present disclosure, the next translation recommendation (the next translation recommendation may be a translation following the provided translation recommendation in the reference translation) from the reference translation may be provided in response to the translation recommendation provided this time being displayed in the editing area as a translation result.

In an embodiment, the case that a non-confirmation operation of the user for the translation recommendation is detected may be the case of detecting that the translation inputted by the user is inconsistent with the translation recommendation provided this time. In this case, the method according to the embodiment of the present disclosure may include receiving a translation inputted by the user that is different from the translation recommendation, and updating the reference translation in the translation area based on the translation inputted by the user. It should also be noted that the translation inputted by the user that is different from the translation recommendation will be regarded as the input of the user in the editing area described in step S14. In other words, in this case, step S14 indicates that in the method according to the embodiment of the present disclosure, the next translation recommendation from the reference translation updated based on the translation inputted by the user may be provided in response to the user inputting the translation different from the translation recommendation in the editing area. For example, the translation recommendation provided this time is "my", and the translation inputted by the user is detected to be a translation "I" different from the translation recommendation "my". In this case, the reference translation is updated based on the translation "I", and the next translation recommendation for a translation following the translation "I" is provided from the updated reference translation.

With the method described above, the translation recommendation from the reference translation can be provided based on the input by the user, and the user can directly use the translation recommendation as the translation result through a confirmation operation, thereby reducing the time taken in the user input. The efficiency and quality of translation can be improved by the combination of the accuracy of manual translation and the efficiency of machine translation in the present disclosure.

In order to enable those skilled in the art to better understand the technical solutions provided in the embodiments of the present disclosure, a document translation method according to the embodiments of the present disclosure will be described in detail below.

Optionally, providing the translation recommendation described in S14 may include: distinctively displaying the translation recommendation from the reference translation in the translation area. In this case, distinctive display of the translation recommendation in the translated text area may be removed, in the case that the confirmation operation of the user for the translation recommendation is detected. The distinctive display can be performed by the means of bold font, highlighted font, different-colored characters, different-colored background, shading effects, etc., which can distinctively display the translation recommendation.

In a possible embodiment, the distinctive display may be performed in a display mode different from the inputted translation. For example, the inputted translation may be displayed in bold font, and the translation recommendation may be displayed in normal font. Alternatively, the inputted translation can be displayed in black font, and the translation recommendation is displayed in gray font, etc. In the case that the confirmation operation of the user for the translation recommendation is detected, the display mode of the translation recommendation can be adjusted to be the same as the display mode of the inputted translation. For example, the inputted translation may be displayed in bold font, and the translation recommendation may be displayed in normal font. In the case that the confirmation operation of the user is detected, the translation recommendation is adjusted to be displayed in bold font.

In a possible embodiment, the confirmation operation may be an input operation of the user on a shortcut key of an electronic device. For example, the electronic device can be a mobile phone, and the shortcut key can be a virtual key on the display area of the mobile phone or a physical key (e.g., a volume key) of the mobile phone. The user can operate the above-mentioned shortcut key to adopt the translation recommendation. In the case that a triggering operation of the user for the above shortcut key is detected, the translation recommendation may be displayed in the editing area as the translation result. The electronic device may also be a computer, and the shortcut key may be a designated or custom key on a keyboard or mouse of the computer (for example, an alt key of the keyboard, and a side key of the mouse).

The confirmation operation may also be a gesture confirmation operation obtained and recognized by the camera, such as nodding, blinking and making a preset gesture; or a voice confirmation operation obtained and recognized by the microphone.

In a possible embodiment, the translation recommendation from the reference translation includes at least one of a word, a phrase, and a sentence.

A manner of providing the translation recommendation is described in detail hereinafter.

When translating the text content, the user can perform an input in the editing area with reference to the reference translation displayed in the translated text area (It should be noted that the input herein includes the input of characters, e.g., typing letters and words, and also includes key operation input, such as clicking on the editing area). The translation recommendation from the reference translation may be provided.

The translation recommendation may be a translation recommendation for the full sentence of the clause, or a translation recommendation for each of words or each of phrases which has a fine granularity.

For example, the text content is "有些城市凭借着完善的高铁网络这一优势不断崛起", and the reference translation of the text content is "Some cities continue to rise with the advantage of the perfect high-speed rail network". When the user clicks the editing area, or inputs the character "S" in the editing area, the translation recommendation "Some" (or some translation recommendations with more coarse granularity, such as "Some cities continue to rise") from the reference translation is provided.

The user may accept the translation recommendation through the confirmation operation. The confirmation operation is used as the input operation in the editing area, so that the recommendation translation from the reference translation is continue to be provided. For example, when the confirmation operation performed by the user on the translation "Some" is detected, the translation "Some" is displayed in the editing area as the translation result, and the next translation recommendation "cities" is provided to the user.

When the non-confirmation operation performed by the user on the translation recommendation is determined, the translation inputted by the user that is different from the translation recommendation is received, and the reference translation is updated in the translation area according to the translation inputted by the user. The non-confirmation operation may be a preset operation representing non-confirmation (for example, clicking a preset button or performing a preset action), or may refer to other situations other than the aforementioned confirmation operation. For example, the confirmation operation has not been performed within a preset time or an operation to continue input is performed.

For example, the text content "有些城市凭借着完善的高铁网络这一优势不断崛起" corresponds to the reference translation "Some cities continue to rise with the advantage of the perfect high-speed rail network". After a clicking input operation of the user on the editing area is received, the translation recommendation "Some" from the reference translation is provided. In response to the user's confirmation operation, the translation recommendation "Some" is displayed in the editing area as the translation result, and the next translation recommendation "cities" is continue to be provided for the user. The input "b" that is different from the translation recommendation is received from user, when the translation recommendation "with" is provided. Then, the reference translation is updated to be "Some cities continue to rise because of the advantage of the perfect high-speed rail network" based on the translation inputted by the user, and the translation recommendation "because" is provided to the user.

It should be noted that when the translation recommendation is the reference translation of the full sentence of the segment, the user may edit the translation recommendation directly in the editing area. For example, the user may insert a word in the translation recommendation, delete a word in the translation recommendation, and change a word in the translation recommendation.

For example, the translation recommendation and the reference translation of the text content "有些城市凭借着完善的高铁网络这一优势不断崛起" are the same, i.e., "Some cities continue to rise with the advantage of the perfect high-speed rail network". When the user modifies the word "with" to "because of" in the translation recommendation, the reference translation is updated to "Some cities continue to rise because of the advantage of the perfect high-speed rail network" according to the modification made by the user. This translation recommendation from the reference translation is provided to the user, and is displayed as the translation result through confirmation operation by the user.

The reference translation and translation recommendation may be provided by machine translation (e.g., a deep learning translation model). It should be noted that when a reference translation that conforms to the text content cannot be generated based on the translation inputted by the user in the editing area, an error correction can be performed on the characters of the translation inputted by the user, based on the pre-stored dictionary content. The reference translation may be updated based on the error-corrected translation.

It should be noted that although the present disclosure takes a case that the translation language is English and the original text is in Chinese as an example, the present disclosure does not limit the translation language and the language of the original text. Various combinations, such as the original text in the present disclosure in classical Chinese and the translation in vernacular Chinese, or the original text in Japanese and the translation in English, may be included in the present disclosure.

In a possible embodiment, the display area for the original text is an editable area. The reference translation in the translation area is updated, in response to a modification operation of the user to the text content in the display area for the original text.

Before or after the user inputs the translation in the translation area, the user may edit the text content, namely, the original text to be translated. Moreover, the translation that has been inputted is not overwritten due to the modification to the original text. The translation result may be updated, based on the modified text content and the inputted translation characters.

For example, the text content before edit is "有些城市凭借着完善的高通网路这一优势不断崛起". The translation recommendation of the text content before edit is "Some cities continue to rise with the advantage of a perfect Qualcomm network". The translation result inputted by the user in the editing area is "Some cities continue to rise b". The reference translation is updated to "Some cities continue to rise because of the advantage of a perfect Qualcomm network", response to the translation "b" different from the translation recommendation. However, the text content of this sentence may be a misrecognized text due to noise and an accent of the voice narrator and the like. The user finds that a current text of this sentence should be "有些城市凭借着完善的高铁网络这一优势不断崛起". Accordingly, the user modifies "高通网路" in the text content to be "高铁网络" The reference translation is then updated to "Some cities continue to rise because of the advantage of the perfect high-speed rail network.", and the translation recommendation from the updated reference translation is provided to the user.

In a possible embodiment, when the length of the edited text content is greater than the length of the text content before edit, the timeline information of the edited text content is obtained according to the timeline information of the text content before edit through interpolation processing.

For example, the text content before edit is "今天要为大家介绍的就是我国的三座城市", and the edited text content is "|今天要为大家介绍 的就是我国即将 崛起的三座城市". In the edited text content, the timeline information of each of characters is reset to 9/11 of the original timeline information. Moreover, when the user performs sentence segmentation, merging and other operations later, the timeline information of the segments subjected to sentence segmentation or merging is determined based on the timeline information of each of characters.

In a possible embodiment, the translation result is added to the picture frame of the video to be translated as a subtitle based on the first time information and the second time information.

For example, it is assumed that in the video to be translated, the timeline of the translation result of the first sentence is "00:00:00-00:00:02" (the first time information is 00:00:00, and the second time information is 00:00:02), the timeline of the translation result of the second sentence is "00:00:03-00:00:07" (the first time information is 00:00:03, and the second time information is 00:00:07). The translation result with the timeline of "00:00:00-00:00:02" is inserted into the video to be translated between the 0th and 2nd seconds, and the translation result with the timeline of "00:00:03-00:00:07" is inserted into the video to be translated between the 3rd and 7th seconds. The translation result may be inserted into the video to be translated in the form of the subtitle.

After all of the translation results are inserted into the video to be translated, the translated video is generated in a format specified by the user and is provided to the user for download.

Based on the above technical solution, at least the following technical effects may be achieved. The speech of the video to be translated is converted into the text. The first time information, the second time information and the reference translation of the text is provided. The translation recommendation from the reference translation is provided following the input of the user in the editing area and is displayed as the translation result in response to the confirmation operation of the user. Therefore, the input time is saved for the user, and the efficiency and quality of video translation are improved by combining the accuracy of human translation with the efficiency of machine translation.

Figure 4:
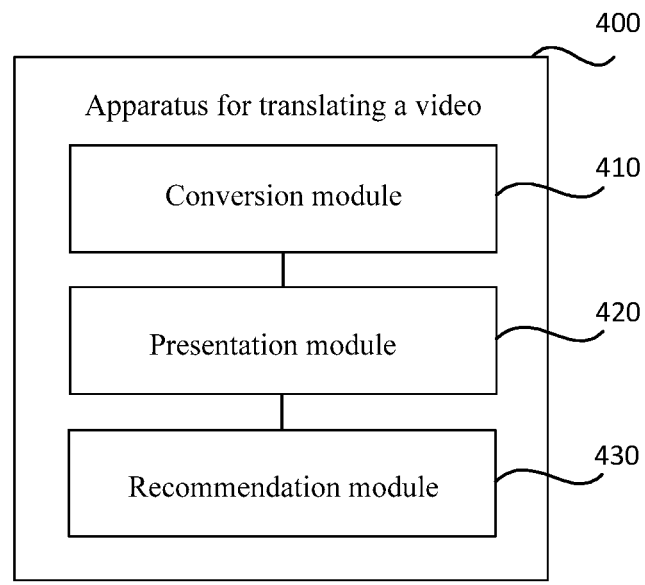
FIG. 4 is a block diagram showing an apparatus for translating a video according to an exemplary disclosed embodiment.

FIG. 4 is a block diagram showing an apparatus for translating a video according to an exemplary disclosed embodiment. As shown in FIG. 4, the apparatus for translating a video 400 includes a conversion module 410, a presentation module 420, and a recommendation module 430.

The conversion module 410 is configured to convert a speech of a video to be translated into a text.

The presentation module 420 is configured to present the text, and first time information, second time information and a reference translation of the text. The first time information is a start time of the text in the video, and the second time information is an end time of the text in the video.

The presentation module 420 is further configured to present an editing area in response to the operation of the user on the text or the reference translation, where the editing area is configured to support the user to input the translation.

The recommendation module 430 is configured to provide a translation recommendation from the reference translation following an input of the user in the editing area.

The presentation module 420 is further configured to display the translation recommendation in the editing area as a translation result, in response to a detection of a confirmation operation of the user on the translation recommendation; and receive a translation inputted by the user that is different from the translation recommendation, in response to a detection of detecting a non-confirmation operation of the user on the translation recommendation, display the translation inputted by the user in the editing area as the translation result, and update the reference translation in a translation area according to the translation inputted by the user. Optionally, the presentation module 420 is further configured to segment the text according to time information and/or picture frame corresponding to the text in the video, to obtain multiple segmented texts; and present, for each of the segmented texts, the segmented text, and the first time information, the second time information and the reference translation of the segmented text.

Optionally, the text includes multiple segmented texts, and different segmented texts are presented in different areas. The apparatus further includes a split module configured to present a split function bar, where the split function bar is configured to support the user to split the segmented texts; split, in response to a split operation of the user on any one of the segmented texts, the segmented text into at least two segmented sub-texts; and display, for each of the segmented sub-texts, the first time information and the second time information pf the segmented sub-text, and the reference translation for the segmented sub-text in association with the segmented sub-text.

Optionally, the text includes multiple segmented texts, and different segmented texts are presented in different areas. The apparatus further includes a merge module configured to present a merge function bar, where the merge function bar is configured to support the user to merge the segmented texts; merge two adjacent segmented texts into a piece of new segmented text in response to the merge operation of the user on any two adjacent segmented texts; and display, for the new segmented text, the first time information and the second time information of the new segmented text, and the reference translation for the new segmented text in association with the new segmented text.

Optionally, the text includes multiple segmented texts, and different segmented texts are presented in different areas. The apparatus further includes a play module configured to present a play function bar, where the play function bar is configured to support the user to play a speech corresponding to the segmented text; and play the speech corresponding to the segmented text in response to an operation of the user on the play function bar.

Optionally, the recommendation module 430 is configured to display the translation recommendation in a display form different from the inputted translation, in the editing area. Displaying the translation recommendation in the editing area as the translation result in response to the confirmation operation of the user on the translation recommendation includes: displaying the translation recommendation in the editing area as the translation result in the same display form as the inputted translation, in response to the confirmation operation of the user on the translation recommendation.

Optionally, the recommendation module 430 is further configured to display the translation recommendation in the editing area as the translation result, in response to a triggering operation of the user on a shortcut key.

The functions of the above modules have been described in detail in the steps of the method according to the embodiment described above, which will not be repeated herein.

Based on the above technical solution, at least the following technical effects may be achieved. The speech of the video to be translated is converted into the text, and the first time information, the second time information and the reference translation of the text is provided. The translation recommendation from the reference translation is provided following the input of the user in the editing area and is displayed as the translation result in response to the confirmation operation of the user. Therefore, the input time is saved for the user, and the efficiency and quality of video translation are improved by combining the accuracy of human translation with the efficiency of machine translation.

Figure 5:
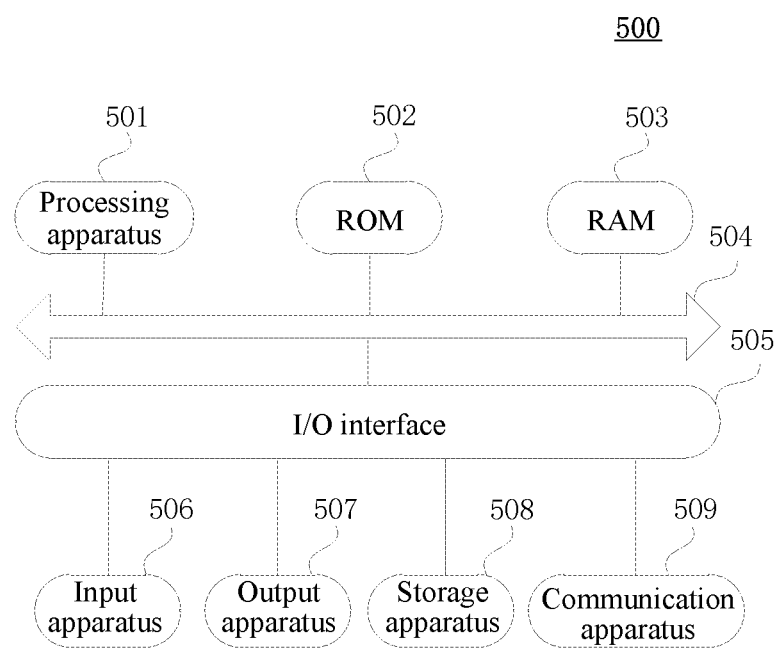
FIG. 5 is a block diagram showing an electronic device according to an exemplary disclosed embodiment.

Reference is made to FIG. 5, which shows a schematic structural diagram of an electronic device (for example, a terminal device or server in FIG. 1) 500 suitable for implementing the embodiments of the present disclosure. The terminal device according to the embodiments of the present disclosure may include, but is not limited to, mobile terminals, such as, a mobile phone, a laptop, a digital broadcast receiver, a personal digital assistants (PDA), a portable android device (PAD), a portable media player (PMP), a vehicle-mounted terminal (such as an in-vehicle navigation terminal); and a fixed terminal such as a digital television (DTV), a desktop computer. The electronic device shown in FIG. 5 is only exemplary, and should not indicate any limitation to the function and scope of application of the embodiments of the present disclosure.

As shown in FIG. 5, the electronic device 500 may include a processing apparatus (such as a central processor or a graphics processor) 501, which may execute various appropriate actions and processing through a program stored in a read-only memory (ROM) 502 or a program loaded from a storage apparatus 508 into a random access memory (RAM) 503. The RAM 503 is further configured to store various programs and data required by the electronic device 500. The processing apparatus 501, the ROM 502 and the RAM 503 are connected to each other through a bus 504. An Input/output (I/O) interface 505 is also connected to the bus 504.

Generally, the I/O interface 505 may be connected to: an input apparatus 506, such as a touch screen, a touch panel, a keyboard, a mouse, a camera, a microphone, an accelerometer, and a gyroscope; an output apparatus 507, such as a liquid crystal display (LCD), a speaker, and a vibrator; a storage apparatus 508 such as a magnetic tape and a hard disk; and a communication apparatus 509. The communication apparatus 509 enables wireless or wired communication between the electronic device 500 and other devices for data exchanging. Although FIG. 5 shows an electronic device 500 having various components, it should be understood that the illustrated apparatuses are not necessarily required to all be implemented or included. Alternatively, more or fewer apparatuses may be implemented or included.

Particularly, according to the embodiments of the present disclosure, the process described above in conjunction with flowcharts may be implemented as a computer software program. For example, a computer program product is provided as an embodiment in the present disclosure, including a computer program carried on a non-transitory computer readable medium. The computer program includes program codes for performing the method shown in the flowchart. In the embodiment, the computer program may be downloaded and installed from the network via the communication apparatus 509, or installed from the storage apparatus 508, or installed from the ROM 502. The computer program, when executed by the processing apparatus 501, causes the processing apparatus 501 to perform the functions defined in the method according to the embodiment of the present disclosure.

It should to be noted that, the computer readable medium mentioned herein above may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. More specific examples of the computer readable storage medium may include, but is not limited to: an electrical connection having one or more wires, a portable computer magnetic disk, a hard disk, a random access memory (RAM), a read-only memory (ROM), an erasable programmable read-only memory (EPROM), or a flash memory, an optical fiber, a portable compact disc read-only memory (CD-ROM), an optical storage device, a magnetic storage device, or any appropriate combination thereof. In the embodiment of the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and can send, propagate or transmit programs to be used by or in combination with an instruction execution system, apparatus or device. The program codes contained in the computer readable medium may be transmitted via any proper medium including, but not limited to, an electrical wire, an optical cable, radio frequency (RF) and the like, or any proper combination thereof.

In some embodiments, a client and a server may communicate with each other using any currently known network protocol, such as hypertext transfer protocol (HTTP) or future developed network protocol, and may interconnect with each other through digital data communication in any form or medium (for example, a communication network). Examples of a communication network include a local area network (LAN), a wide area network (WAN), the internet ((for example, the Internet), and an end-to-end network (for example, ad hoc end-to-end network) or any currently known or future developed network.

The computer readable medium may be incorporated in the electronic device, or may exist alone without being assembled into the electronic device.

The computer readable medium carries one or more programs. The one or more programs, when being executed by the electronic device, cause the electronic device to perform following steps: converting a speech of a video to be translated, to a text; presenting the text, and first time information, second time information and a reference translation of the text, wherein the first time information is a start time of the text in the video, and the second time information is an end time of the text in the video; presenting an editing area in response to an operation of a user on the text or the reference translation, wherein the editing area is configured to support the user to input a translation; and providing a translation recommendation from the reference translation, following an input of the user in the editing area, where the translation recommendation is displayed in the editing area as a translation result in response to a detection of a confirmation operation of the user on the translation recommendation; and a translation inputted by the user that is different from the translation recommendation is received in response to a detection of a non-confirmation operation of the user on the translation recommendation, the translation inputted by the user is displayed in the editing area as the translation result, and the reference translation in a translation area is updated according to the translation inputted by the user.

The computer program code for performing the operations disclosed in the present disclosure may be written in one or more programming languages or combinations thereof. The programming languages include, but not limit to, an object-oriented programming language, such as Java, Smalltalk, and C++, and a conventional procedural programming language, such as C language or a similar programming language. The program code may be executed entirely on a user computer, partially on the user computer, as a standalone software package, partially on the user computer and partially on a remote computer, or entirely on the remote computer or a server. In a case involving a remote computer, the remote computer may be connected to the user computer through any network, including local area network (LAN) or wide area network (WAN), or may be connected to an external computer (for example, through the Internet provided by an Internet service provider)

Flow charts and block charts in the drawings illustrate the architecture, functions and operations that can be implemented by the system, method and computer program produce according to the embodiments of the present disclosure. Each block in a flowchart or a block diagram may represent a module, a program segment, or a part of code, and the module, program segment, or the part of code contains one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each of the blocks in the block diagram and/or flowchart and a combination of the blocks in the block diagram and/or flowchart may be implemented by a dedicated hardware-based system that performs specified functions or operations, or may be realized by a combination of dedicated hardware and computer instructions.

The modules mentioned in the embodiments of the present disclosure may be implemented by means of software, or otherwise by means of hardware. In some circumstances, the name of a module does not constitute a limitation on the module itself. For example, a first acquisition module may also be described as "a module for acquiring at least two internet protocol addresses".

The functions described herein above may be performed, at least in part, by one or more hardware logic components. For example, without limitation, the exemplary hardware logic components that may be used include: a field programmable gate array (FPGA), an application specific integrated circuit (ASIC), application specific standard parts (ASSP), a system on a chip (SOC), a complex programmable logic device (CPLD) and so on.

In the context of the present disclosure, the machine readable medium may be a tangible medium that may contain or store a program, and the program may be used by or in connection with an instruction execution system, apparatus or device. The machine readable medium may be a machine readable signal medium or a machine readable storage medium. The computer readable medium may include, but is not limited to, a system, an apparatus, or a device in an electronic, magnetic, optical, electromagnetic, infrared, or semi-conductive form, or any suitable combination thereof. More specific examples of the machine readable storage medium may include, an electrical connection based on one or more wire, a portable computer disk, a hard disk, a random access memory (RAM), a read-only memory (ROM), an erasable programmable read-only memory (EPROM or fast flash memory), an optical fiber, a portable compact disc read-only memory (CD-ROM), an optical storage device, a magnetic storage device or any suitable combination thereof.

According to one or more embodiments of the present disclosure, a method for translating a video is provided according to Example 1. The method includes: converting a speech of a video to be translated, to a text; presenting the text, and first time information, second time information and a reference translation of the text, where the first time information is a start time of the text in the video, and the second time information is an end time of the text in the video; presenting an editing area in response to an operation of a user on the text or the reference translation, where wherein the method further includes: displaying the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, displaying the translation inputted by the user in the editing area as the translation result, and updating the reference translation in a translation area according to the translation inputted by the user. According to one or more embodiments of the present disclosure, the method of Example 1 is provided in Example 2. The method includes: segmenting the text according to time information and/or a picture frame corresponding to the text in the video, to obtain multiple segmented texts; and presenting, for each of the segmented texts, the segmented text, and the first time information, the second time information and the reference translation of the segmented text.

According to one or more embodiments of the present disclosure, the method of Example 1 is provided in Example 3. The text includes multiple of segmented texts, and different segmented texts are presented in different areas; and the method further includes: presenting a split function bar configured to support the user to split the segmented texts; and splitting, in response to a split operation of the user on one segmented text of the segmented texts, the segmented text into at least two segmented sub-texts; and displaying, for each of the segmented sub-texts, the first time information and the second time information of the re-segmented sub-text, and the reference translation for the re-segmented text in association with the segmented sub-text.

According to one or more embodiments of the present disclosure, the method of Example 1 is provided in Example 4. The text includes multiple of segmented texts, and different segmented texts are presented in different areas; and the method further includes: presenting a merge function bar configured to support the user to merge the segmented texts; merging two adjacent segmented texts into a piece of new segmented text in response to a merge operation of the user on any two adjacent segmented texts; and displaying, for the new segmented text, the first time information and the second time information of the new segmented text, and the reference translation for the new segmented text in association with the new segmented text.

According to one or more embodiments of the present disclosure, the method of Examples 1-4 is provided in Example 5. The text includes multiple of segmented texts, and different segmented texts are presented in different areas; and the method further includes: presenting a play function bar configured to support the user to play a speech corresponding to the segmented text; playing the speech corresponding to the segmented text, in response to an operation of the user on the play function bar.

According to one or more embodiments of the present disclosure, the method of Examples 1-4 is provided in Example 6. The providing a translation recommendation from the reference translation includes: displaying the translation recommendation in the editing area in a display form different from the inputted translation; where the translation recommendation is displayed in the editing area as the translation result in response to a confirmation operation of the user on the translation recommendation includes: displaying the translation recommendation in the editing area as the translation result in the same display form as the inputted translation, in response to the confirmation operation of the user on the translation recommendation.

According to one or more embodiments of the present disclosure, the method of Examples 1-4 is provided in Example 7. The translation recommendation is displayed in the editing area as the translation result in response to a confirmation operation of the user on the translation recommendation by: displaying the translation recommendation in the editing area as the translation result, in response to a triggering operation of the user on a shortcut key.

According to one or more embodiments of the present disclosure, an apparatus for translating a video is provided in Example 8. The apparatus includes: a conversion module configured to convert a speech of a video be translated into a text; a presentation module configured to present the text, and first time information, second time information and a reference translation corresponding to the text, where the first time information is a start time of the text in the video, and the second time information is an end time of the text in the video, where the presentation module is further configured to present an editing area in response to an operation of a user on the text or the reference translation, where the editing area is configured to support the user to input a translation; a recommendation module configured to provide a translation recommendation from the reference translation, following an input of the user in the editing area; where the presentation module is further configured to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result, and update the reference translation in a translation area according to the translation inputted by the user.

According to one or more embodiments of the present disclosure, the apparatus of Example 8 is provided in Example 9. The presentation module is further configured to segment the text according to time information and/or a picture frame corresponding to the text in the video, to obtain multiple segmented texts; and present, for each of the segmented texts, the segmented text, and the first time information, the second time information and the reference translation corresponding to the segmented text.

According to one or more embodiments of the present disclosure, the apparatus of Example 8 is provided in Example 10. The text includes multiple segmented texts, and different segmented texts are presented in different areas. The apparatus further includes a split module configured to present a split function bar, where the split function bar is configured to support the user to split the segmented texts; split, in response to a split operation of the user on one segmented text of the segmented texts, the segmented texts into at least two segmented sub-texts; and display, for each of the segmented sub-texts, the first time information and the second time information of the segmented sub-text, and the reference translation for the segmented sub-text in association with the segmented sub-text.

According to one or more embodiments of the present disclosure, the apparatus of Example 8 is provided in Example 11. The text includes multiple of segmented texts, and different segmented texts are presented in different areas. The apparatus further includes a merge module configured to present a merge function bar, where the merge function bar is configured to support the user to merge the segmented texts; merge two adjacent segmented texts into a piece of new segmented text in response to a merge operation of the user on any two adjacent segmented texts; and display, for the new segmented text, the first time information and the second time information of the new segmented text, and the reference translation for the new segmented text in association with the new segmented text.

According to one or more embodiments of the present disclosure, the apparatus of Examples 8-11 is provided in Example 12. The text includes multiple of segmented texts, and different segmented texts are presented in different areas. The apparatus further includes a play module configured to present a play function bar, where the play function bar is configured to support the user to play the speech corresponding to the segmented text; and play the speech corresponding to the segmented text in response to an operation of the user on the play function bar.

According to one or more embodiments of the present disclosure, the apparatus of Examples 8-11 is provided in Example 13. The recommendation module is configured to display the translation recommendation in the editing area in a display form different from the inputted translation. Displaying the translation recommendation in the editing area as the translation result in response to a confirmation operation of the user on the translation recommendation includes: displaying the translation recommendation in the editing area as the translation result in the same display form as the inputted translation, in response to the confirmation operation of the user on the translation recommendation.

According to one or more embodiments of the present disclosure, the apparatus of Examples 8-11 is provided in Example 14. The recommendation module is further configured to display the translation recommendation in the editing area as the translation result in response to a triggering operation of the user on a shortcut key.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, a technical solution formed by interchanging the above features and technical features having similar functions as disclosed, but not limited to, in the present disclosure with each other is also covered with the scope of the present disclosure.

Moreover, although the above operations are described in a specific order, it should not be understood that these operations are required to be performed in the specific order or performed in a sequential order. In some conditions, multitasking and parallel processing may be advantageous.

Although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the specific features or actions described above. The specific features and actions described above are only examples of the implementation of the claims. For the apparatus according to the embodiments described above, the manners in which the modules perform operations have been described in detail in the embodiments of the method, which are not described in detail herein.

The invention claimed is:

1. A method for translating a video, comprising:
converting a speech of a video to be translated, to a text;
presenting the text, and first time information, second time information and a reference translation of the text, wherein the first time information is a start time of the text in the video, and the second time information is an end time of the text in the video;
presenting an editing area in response to an operation of a user on the text or the reference translation, wherein the editing area is configured to support the user to input a translation; and
providing a translation recommendation from the reference translation, following an input of the user in the editing area,
wherein the method further comprises:
displaying the translation recommendation in the editing area as a translation result, in a case that a confirmation operation of the user for the translation recommendation is detected; or
in a case that a confirmation operation of the user for the translation recommendation is not detected and a translation inputted by the user that is different from the translation recommendation is received, displaying the translation inputted by the user in the editing area as the translation result, and updating the reference translation in a translation area according to the translation inputted by the user, and
wherein the providing a translation recommendation from the reference translation comprises:
displaying the translation recommendation in the editing area, in a display mode different from the inputted translation; and distinctively displaying the translation recommendation from the reference translation in the translation area.

2. The method according to claim 1, wherein the presenting the text, and first time information, second time information and a reference translation of the text comprises:
segmenting the text according to time information and/or a picture frame corresponding to the text in the video, to obtain a plurality of segmented texts; and
presenting, for each of segmented texts, the segmented text, the first time information, the second time information and the reference translation of the segmented text.

3. The method according to claim 1, wherein the text comprises a plurality of segmented texts, and different segmented texts are presented in different areas, and the method further comprises:
presenting a split function bar configured to support the user to split the segmented texts; and
splitting, in response to a split operation of the user on one segmented text of the segmented texts, the segmented text into at least two segmented sub-texts; and displaying, for each of the segmented sub-texts, the first time information and the second time information of the segmented sub-text, and the reference translation for the segmented sub-text in association with the segmented sub-text.

4. The method according to claim 1, wherein the text comprises a plurality of segmented texts, and different segmented texts are presented in different areas, and the method further comprises:
presenting a merge function bar configured to support the user to merge the segmented texts; and
merging two adjacent segmented texts into a piece of new segmented text in response to a merge operation of the user on the two adjacent segmented texts; and displaying, for the new segmented text, the first time information and the second time information of the new segmented text, and the reference translation for the new segmented text in association with the new segmented text.

5. The method according to claim 1, wherein the text comprises a plurality of segmented texts, and different segmented texts are presented in different areas, and the method further comprises:
presenting a play function bar configured to support the user to play a speech corresponding to the segmented text; and
playing the speech corresponding to the segmented text, in response to an operation of the user on the play function bar.

6. The method according to claim 1,
wherein the translation recommendation is displayed in the editing area as the translation result in response to a confirmation operation of the user on the translation recommendation by: displaying the translation recommendation in the editing area as the translation result in a same display form as the inputted translation, in response to the confirmation operation of the user on the translation recommendation.

7. The method according to claim 1, wherein the translation recommendation is displayed in the editing area as the translation result in response to a confirmation operation of the user on the translation recommendation by:
displaying the translation recommendation in the editing area as the translation result in response to a triggering operation of the user on a shortcut key.

8. An apparatus for translating a video, comprising:
a storage apparatus storing a computer program, and
a processing apparatus configured to execute the computer program stored on the storage apparatus, wherein the computer program, when executed by the processing apparatus, performs to
convert a speech of a video to be translated, into a text;
present the text, and first time information, second time information and a reference translation corresponding to the text, wherein the first time information is a start time of the text in the video, and the second time information is an end time of the text in the video;

present an editing area in response to an operation of a user on the text or the reference translation, wherein the editing area is configured to support the user to input a translation; and provide a translation recommendation from the reference translation, following an input of the user in the editing area, wherein the computer program, when executed by the processing apparatus, causes the processing apparatus to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result, and update the reference translation in a translation area according to the translation inputted by the user, and wherein the computer program, when executed by the processing apparatus, causes the processing apparatus further to:

display the translation recommendation in the editing area, in a display mode different from the inputted translation; and distinctively display the translation recommendation from the reference translation in the translation area.

9. The apparatus according to claim 8, wherein the computer program, when executed by the processing apparatus, causes the processing apparatus to segment the text according to time information and/or a picture frame corresponding to the text in the video, to obtain a plurality of segmented texts; and present, for each of segmented texts, the segmented text, and the first time information, the second time information and the reference translation of the segmented text.

10. The apparatus according to claim 8, wherein the text comprises a plurality of segmented texts, and different segmented texts are presented in different areas, and wherein the computer program, when executed by the processing apparatus, causes the processing apparatus to present a split function bar configured to support the user to split the segmented texts; and split, in response to a split operation of the user on one segmented text of the segmented texts, the segmented text into at least two segmented sub-texts; and display, for each of the segmented sub-texts, the first time information and the second time information of the segmented sub-text, and the reference translation for the segmented sub-text in association with the segmented sub-text.

11. The apparatus according to claim 8, wherein the text comprises a plurality of segmented texts, and different segmented texts are presented in different areas, and wherein the computer program, when executed by the processing apparatus, causes the processing apparatus to present a merge function bar configured to support the user to merge the segmented texts; and merge two adjacent segmented texts into a piece of new segmented text in response to a merge operation of the user on the two adjacent segmented texts; and display, for the new segmented text, the first time information and the second time information of the new segmented text, and the reference translation for the new segmented text in association with the new segmented text.

12. The apparatus according to claim 8, wherein the text comprises a plurality of segmented texts, and different segmented texts are presented in different areas, and wherein the computer program, when executed by the processing apparatus, causes the processing apparatus to present a play function bar configured to support the user to play a speech corresponding to the segmented text; and play the speech corresponding to the segmented text, in response to an operation of the user on the play function bar.

13. The apparatus according to claim 8, wherein the computer program, when executed by the processing apparatus, causes the processing apparatus to display the translation recommendation in the editing area as the translation result in a same display form as the inputted translation, in response to the confirmation operation of the user on the translation recommendation.

14. The apparatus according to claim 8, wherein the computer program, when executed by the processing apparatus, causes the processing apparatus to display the translation recommendation in the editing area as the translation result in response to a triggering operation of the user on a shortcut key.

15. A non-transitory computer readable medium storing a computer program, wherein the program, when being executed by a processing apparatus, causes the processing apparatus to convert a speech of a video to be translated, into a text;

present the text, and first time information, second time information and a reference translation corresponding to the text, wherein the first time information is a start time of the text in the video, and the second time information is an end time of the text in the video;

present an editing area in response to an operation of a user on the text or the reference translation, wherein the editing area is configured to support the user to input a translation; and provide a translation recommendation from the reference translation, following an input of the user in the editing area, wherein the computer program, when executed by the processing apparatus, causes the processing apparatus to display the translation recommendation in the editing area as a translation result, in a case that a confirmation operation of the user for the translation recommendation is detected; or in a case that a confirmation operation of the user for the translation recommendation is not detected and a translation inputted by the user that is different from the translation recommendation is received, display the translation inputted by the user in the editing area as the translation result, and update the reference translation in a translation area according to the translation inputted by the user, and wherein the computer program, when executed by the processing apparatus, causes the processing apparatus further to:

display the translation recommendation in the editing area, in a display mode different from the inputted translation; and distinctively display the translation recommendation from the reference translation in the translation area.

16. The non-transitory computer readable medium according to claim 15, wherein the computer program, when executed by the processing apparatus, causes the processing apparatus to
    segment the text according to time information and/or a picture frame corresponding to the text in the video, to obtain a plurality of segmented texts; and
    present, for each of segmented texts, the segmented text, and the first time information, the second time information and the reference translation of the segmented text.

17. The non-transitory computer readable medium according to claim 15, wherein the text comprises a plurality of segmented texts, and different segmented texts are presented in different areas, and wherein the computer program, when executed by the processing apparatus, causes the processing apparatus to
    present a split function bar configured to support the user to split the segmented texts; and
    split, in response to a split operation of the user on one segmented text of the segmented texts, the segmented text into at least two segmented sub-texts; and display, for each of the segmented sub-texts, the first time information and the second time information of the segmented sub-text, and the reference translation for the segmented sub-text in association with the segmented sub-text.

18. The non-transitory computer readable medium according to claim 15, wherein the text comprises a plurality of segmented texts, and different segmented texts are presented in different areas, and wherein the computer program, when executed by the processing apparatus, causes the processing apparatus to
    present a merge function bar configured to support the user to merge the segmented texts; and
    merge two adjacent segmented texts into a piece of new segmented text in response to a merge operation of the user on the two adjacent segmented texts; and display, for the new segmented text, the first time information and the second time information of the new segmented text, and the reference translation for the new segmented text in association with the new segmented text.

19. The non-transitory computer readable medium according to claim 15, wherein the text comprises a plurality of segmented texts, and different segmented texts are presented in different areas, and wherein the computer program, when executed by the processing apparatus, causes the processing apparatus to
    present a play function bar configured to support the user to play a speech corresponding to the segmented text; and
    play the speech corresponding to the segmented text, in response to an operation of the user on the play function bar.

20. The non-transitory computer readable medium according to claim 15, wherein the computer program, when executed by the processing apparatus, causes the processing apparatus to
    display the translation recommendation in the editing area as the translation result in a same display form as the inputted translation, in response to the confirmation operation of the user on the translation recommendation.

\* \* \* \* \*